United States Patent [19]

Takiguchi

[11] Patent Number: 4,902,135
[45] Date of Patent: Feb. 20, 1990

[54] OBJECT MOVEMENT MEASURING APPARATUS

[75] Inventor: Yoshihiro Takiguchi, Shizuoka, Japan

[73] Assignee: Hamamatsu Photonics Kabushiki Kaisha, Shizuoka, Japan

[21] Appl. No.: 187,009

[22] Filed: Apr. 27, 1988

[30] Foreign Application Priority Data

Apr. 28, 1987 [JP] Japan .................. 62-105270

[51] Int. Cl.$^4$ ............................................. G01B 11/00
[52] U.S. Cl. ................................. 356/373; 356/375; 356/376; 250/213 VT
[58] Field of Search ............ 356/373, 375, 376; 250/560, 213 VT, 561

[56] References Cited

U.S. PATENT DOCUMENTS 4,238,148 12/1980 Courtney-Pratt ............... 354/112

FOREIGN PATENT DOCUMENTS

277538/88 12/1987 Japan .

OTHER PUBLICATIONS

Fujimoto, J. G., et al., "Femtosecond Optical Ranging in Biological Systems", Optics Letters, vol. 11, pp. 150-152, Mar. 1986.
Caulfield, H. J. et al., "Laser Stereometry", Proceedings of the IEEE, vol. 65, pp. 84-88, Jan. 1977.

Primary Examiner—F. L. Evans
Attorney, Agent, or Firm—Finnegan, Henderson, Farabow, Garrett and Dunner

[57] ABSTRACT

In an object movement measuring apparatus, a movement monitor detects the movement of an object under measurement to output a signal in synchronization with the movement, and the signal thus outputted is utilized to trigger the streak camera, so that the motion of an object moving at high-speed can be detected as a streak image.

12 Claims, 6 Drawing Sheets

SECTIONAL DIRECTION ⊗

SPATIAL DIRECTION

SPATIAL DIRECTION

SECTIONAL DIRECTION

OBJECT MOVEMENT MEASURING APPARATUS

BACKGROUND OF THE INVENTION

This invention relates to an object movement measuring apparatus.

The present applicant has proposed a three-dimensional object measuring apparatus in which a streak camera is used to detect the surface configuration and the internal structure of a three-dimensional object (cf. Japanese Patent Application Laid-open No. 277538/1987 (Dec. 2, 1987) and U.S. Pat. application Ser. No. 074,879 (July 17, 1987)).

One example of the three-dimensional object measuring apparatus, as shown in FIG. 5, comprises: a pulse laser 1, beam splitters 2 and 4; a beam expander 3; a total reflection mirror 5; a stationary reflection mirror 6; a movable reflection mirror 7; shutter apertures 8 and 9; total reflection mirrors 10 and 11; an image forming lens 13; an input slit 14; a streak camera 15; a detector 16; an amplifier 17; a delay circuit 18; a reading device 19; and a monitor 20. In FIG. 5, reference numeral 12 designates an object under measurement.

A pulse beam from the pulse laser 1 is split by the beam splitter 2 into two parts, one of which is applied to the detector 16, where it is converted into an electrical signal. The electrical signal is applied, as a gate trigger signal, to the streak camera through the delay circuit 18. On the other hand, the beam passed through the beam splitter 2 is expanded by the beam expander 3 and split by the beam splitter 4. The beam passed through the beam splitter 4 is applied to the object 12 from above with the aid of the total reflection mirrors 5 and 10. At the same time, the beam reflected by the beam splitter 4 is reflected by the stationary reflection mirror 6 and the movable reflection mirror 7 which form an optical delay system and by the total reflection mirror 11 so that it is applied to the object 12 from below. That is, the object is irradiated from above and below in the above-described manner. The light beams reflected from the surface of the object 12 go backward along the incident optical paths, while the light beams passed through the object 12 advance along the optical paths which are opposite to the incident optical paths, respectively, so that they are applied through the image forming lens 13 to the streak camera 15. In this case, according to the purpose of the measurement, the lens 13 is adjusted so that the light beam from the front or back surface of the object is focused, or instead of the lens 13 a zoom lens is used so that a part of the object can be observed with different magnifications. The streak image formed by the streak camera is read with the reading device 19, and is observed and subjected to some operation such ad analyzing.

In the apparatus described above, a light beam reflected from an object 12 having a recess as shown in FIG. 6 is applied to the streak camera with a time delay corresponding to two times the depth of the recess. Therefore, the depth $d_1$ of the recess is:

$$d_1 = c \cdot t / 2$$

where c is the velocity of light, and t is the delay time of the streak image corresponding to the recess of $d_1$. Thus, the outside dimension of the object can be obtained. In FIG. 6, $\Delta t$ means a width of the pulse beam.

On the other hand, if it is assumed that the object uniformly has a refractive index n in an internal structure measurement, then the transmission time difference t is:

$$t = (n/c)(W_2 - W_1).$$

Therefore, by measuring t from the streak image, the value n can be obtained when $(W_2 - W_1)$ is known.

FIG. 7 shows one example of a conventional object internal structure measuring apparatus. In FIG. 7, those components which have been described with reference to FIG. 5 are therefore designated by the same reference numerals. In FIG. 7, reference numeral 21 designates an optical fiber; and 22, an image forming optical system including a lens 23, a half-mirror 24 and a total reflection mirror 25.

In the apparatus of FIG. 7, the pulse beam from the pulse laser 1 is applied through the optical fiber 21 to the inside of the object 12 under measurement and radiated at a suitable solid angle, and the beam passed through the object by the radiation is focused on the photocathode of the streak tube in the streak camera 15 by means of the image-forming optical system 22. As was described above, the image-forming optical system 22 is made up of the lens 23, the half-mirror 24 and the total reflection mirror 25. That is, the system 22 is so designed that the image formed through the half-mirror 24 and the image formed through the total reflection mirror 25 are subjected to analysis.

The pulse beam emerging from the end of the inside part of the object is a spherical wave. Therefore, the streak image formed by the streak camera is such that the image of the internal structure of the object is superposed on the spherical-wave-shaped pulse beam image. Accordingly, the internal structure of the object can be detected by the following method: with the analyzing device (the monitor) 20, the curvature of the spherical wave of the light beam emerging from the optical fiber is calculated in advance, and the curvature thus calculated is removed from the streak image.

On the other hand, in measuring an object in motion with the above-described three-dimensional object measuring apparatus, all the images of the objects in motion is integrated as the output image of the streak camera, and therefore it is impossible to evaluate the motion of the object.

Heretofore, an apparatus utilizing moire fringes or slit pattern projection is used to optically monitor the movement of an object in a sectional direction.

FIG. 8 is a diagram for a description of the formation of moire fringes. FIG. 9 is a diagram showing one example of a moire-fringes-reading optical system. In FIG. 9, reference characters $G_1$ and $G_2$ designate gratings; $L_1$ and $L_2$, lenses; Q, a lamp as a light source; P, a photoelectric conversion device; and S, an aperture (lens stop).

When the two gratings $G_1$ and $G_2$ which are equal in grating interval are piled one on another in such a manner that they form a small angle $\theta$, moire fringes are formed, as shown in FIG. 8. When, with the grating $G_2$ fixed, the grating $G_1$ is moved by a grating interval d in a direction perpendicular to the direction of grating, then the moire fringe pattern is moved by one fringe. This distance of movement l can be calculated as follows:

$$l = d/\theta.$$

Therefore, the movement of the grating $G_1$ can be determined by detecting the movement of the fringes.

FIG. 10 shows one example of the projection of a slit pattern on an object under measurement.

As shown in FIG. 10, a parallel straight line grating (opaque) having a pitch s is placed over an object, and the object is irradiated through the grating by a point light source LS at a distance L from the grating so that it is observed with the eye at the same distance L from the grating. In this case, what are observed bright are the parts of the object's surface which are irradiated by the light source and can be seen with the eye (intersections of solid lines and dashed lines). Such parts (bright points) appear in the form of layers arranged in the direction of depth. In FIG. 10, "N (the order of a bright point layer)=i" means the fact that in the i-th layer below the grating the parts irradiated by the light source coincide with those which can be seen with the eye. The distance $h_N$ of an N-th bright point layer from the grating can be obtained as follows: The bright points of the N-th layer are defined by the intersections of the solid lines and the broken lines which pass through the grating gaps, and therefore $$\frac{h_N}{h_N + L} = \frac{Ns}{D}$$

where D is the distance between the light source and the eye measured in parallel with the grating surface.

The above-described equation can be rewritten as follows:

$$h_N = N L s / (D - N s)$$

Thus, the line connecting the bright points on the N-th (1st, 2nd, . . . . .) layer; that is, the contour line formed by connecting the bright points equal in depth from the grating surface is formed on the object.

In this case also, the movement of the object can be obtained by detecting the movement of the bright points.

However, the above-described method of detecting the movement of an object by utilizing moire fringes is disadvantageous in that an apparatus for practicing the method is unavoidably intricate in construction. That is, in the apparatus, to detect the movement along the direction of movement it is necessary to provide two windows in such a manner that they are disposed in parallel with the moire fringes and spaced by a quarter ($\frac{1}{4}$) of the pitch l, to convert the luminances of the windows into electrical signals by photoelectric conversion devices, and to determine whether or not one of the electrical signals leads or lags the other in phase. When it is required to detect the movement of the object in an arbitrary direction, it is necessary to provide two more windows in a direction perpendicular to the moire fringes for phase detection. In this case, the apparatus is more intricate in construction.

In the method of projecting a slit pattern on an object, as is apparent from the above description, the motion of the object cannot be measured without trigonometry, and it is difficult to detect the high speed motion of an object at a given time instant and analyze it.

SUMMARY OF THE INVENTION

Accordingly, an object of this invention is to eliminate the above-described difficulties accompanying a conventional object movement measuring method.

More specifically, an object of the invention is to provide an object movement measuring apparatus in which the motion of an object moving at high speed is analyzed at a given time instant in connection with the motion of the object.

The foregoing object and other objects of the invention have been achieved by the provision of an object movement measuring apparatus which, according to the invention, comprises: a pulse light source; an illuminating optical system for illuminating an object under measurement with a light beam outputted from the pulse light source; a streak tube; an image-forming lens system for focusing a reflection light beam or transmission light beam from the object on the photocathode of a streak tube; a movement monitor for detecting movement of the object, to provide a synchronizing signal which is synchronous with the movement thus detected, and a gate trigger signal generator for producing a gate trigger signal to trigger the streak tube with the aid of the synchronizing signal outputted from the movement monitor.

The nature, utility and principle of the invention will be more clearly understood from the following detailed description and the appended claimed claims when read in conjunction with the accompanying drawings.

DETAILED DESCRIPTION OF THE INVENTION

Figure 1:
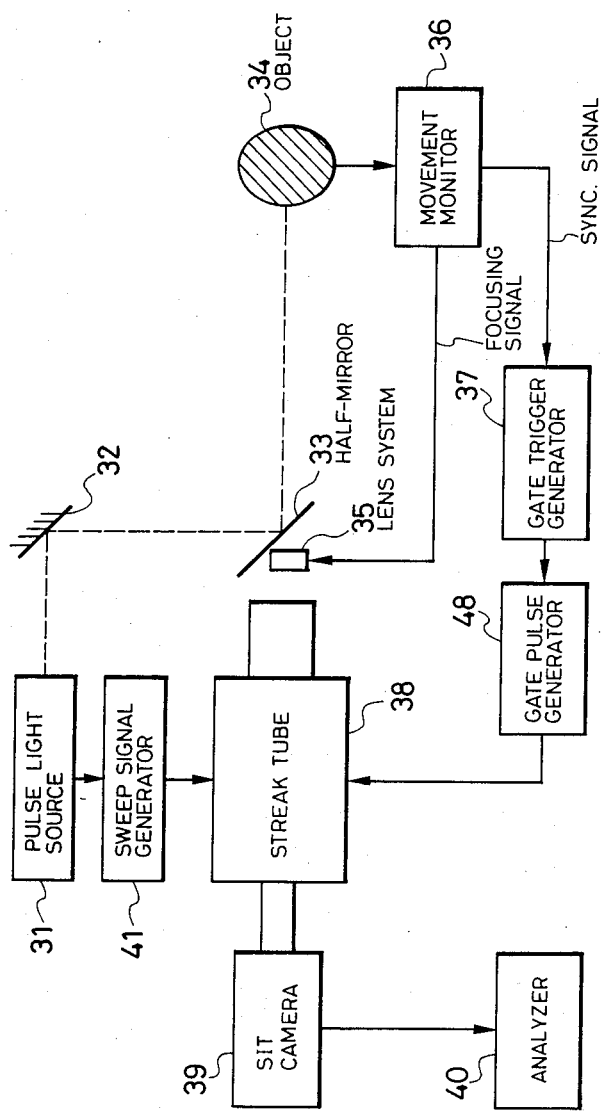
FIG. 1 is a block diagram showing the arrangement of a first example of an object movement measuring apparatus according to this invention.

FIG. 1 shows the fundamental arrangement of an object movement measuring apparatus according to this invention. In FIG. 1, reference numeral 31 designates a pulse light source; 32, a total reflection mirror; 33, a half-mirror; 34, an object under measurement; 35, an image-forming lens system; 36, a movement monitor; 37, a gate trigger signal generator; 48, a gate pulse generator; 38, a streak tube; 39, a SIT (silicon intensifier target) camera; 40, an analyzer; and 41, a sweep signal generator.

Figure 5:
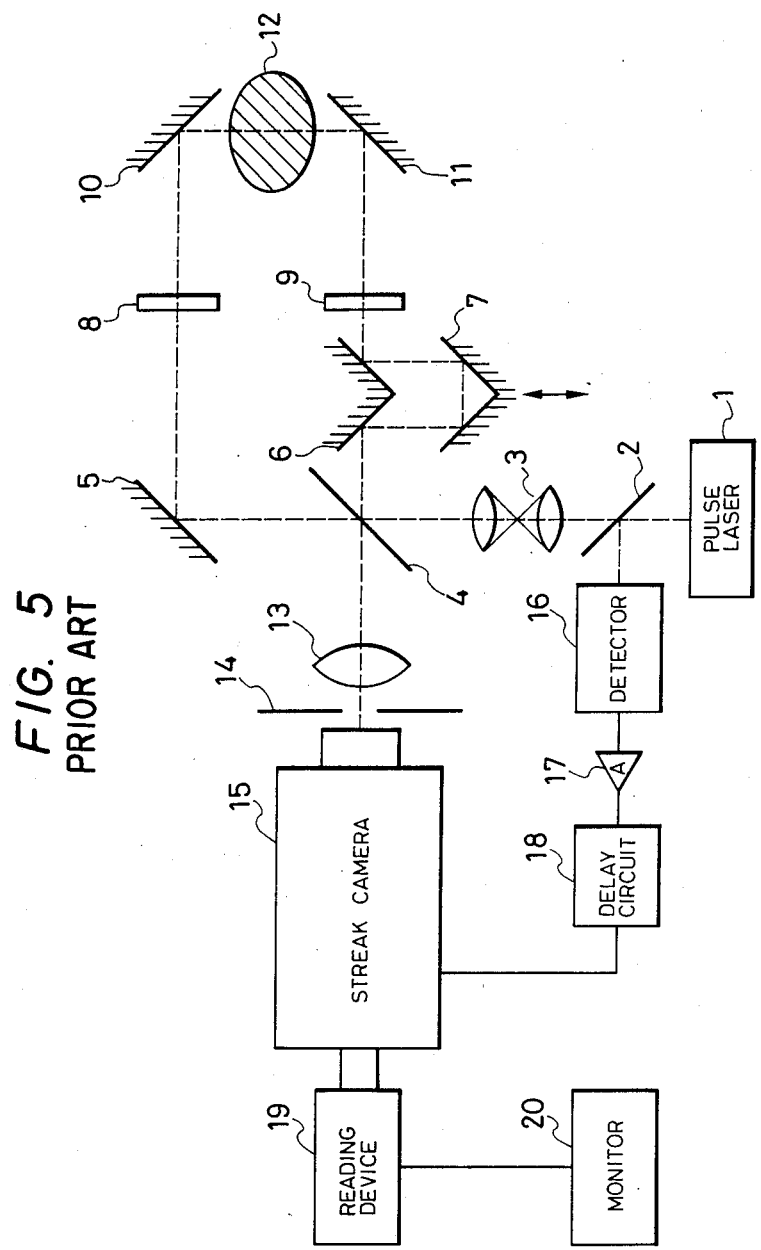
FIG. 5 is an explanatory diagram showing one example of a conventional three-dimensional object measuring apparatus.
Figure 6:
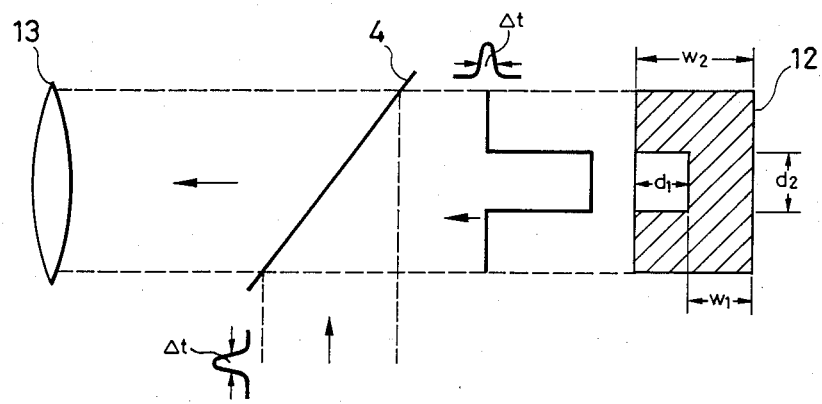
FIG. 6 is an explanatory diagram showing one example of a surface configuration measurement.
Figure 7:
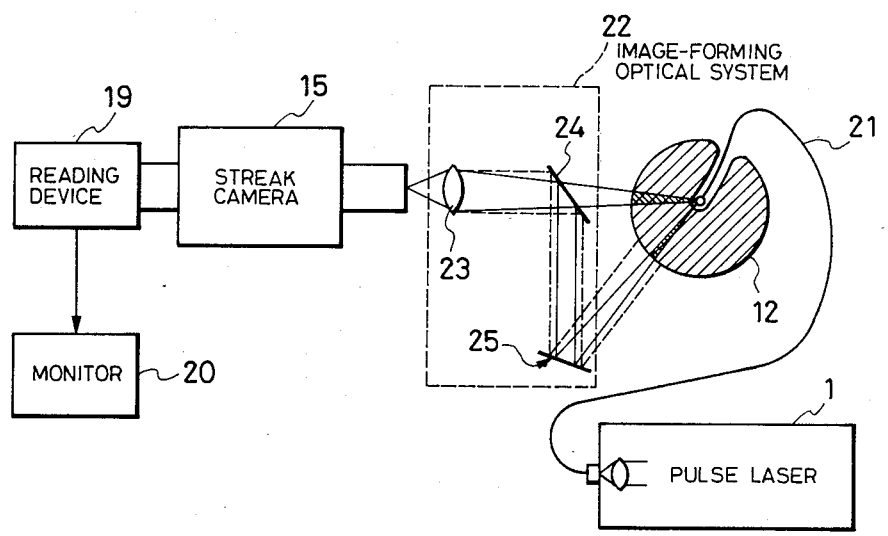
FIG. 7 is an explanatory diagram, partly as a block diagram, showing one example of a conventional apparatus for measuring the internal structure of an object.
Figure 8:
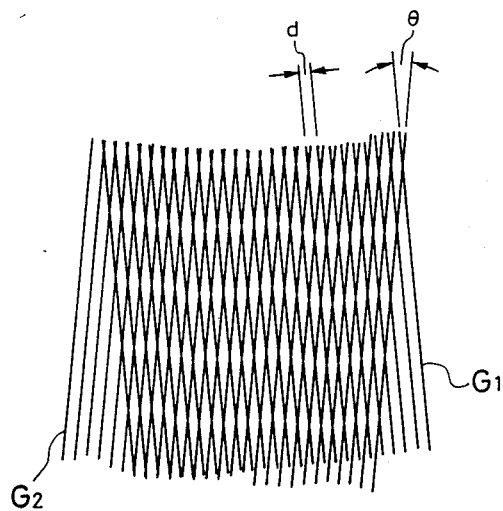
FIG. 8 is an explanatory diagram for a description of the formation of moire fringes.
Figure 9:
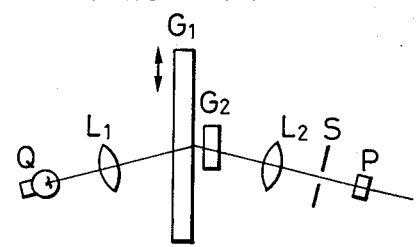
FIG. 9 is an explanatory diagram showing one example of a moire-fringes-reading optical system.
Figure 10:
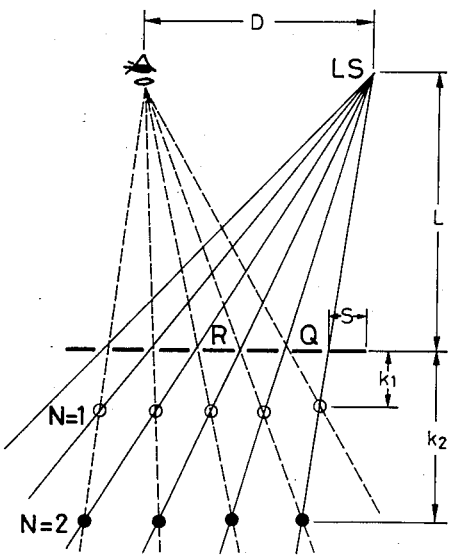
FIG. 10 is an explanatory diagram showing one example of the projection of a slit pattern on an object under measurement.

Those components used in the above-described conventional apparatus shown in FIG. 5 or 7 which utilizes the short pulse light beam and the streak camera swept in synchronization with the light beam are also employed, and their detailed description will not be made in the following description of the invention.

In the apparatus of FIG. 1, a high-speed repetitive light beam from the pulse light source 31 is applied through the total reflection mirror 32 and the half-mirror 33 to the object 34. Similarly as in the case of FIG. 5 or 7, the reflection image or transmission image of the object 34 is formed on the photocathode of the streak tube 38 by the image forming lens system 35. The obtained streak image is picked-up with the SIT camera to provide an electrical signal, which is analyzed with the analyzer 40 so that the surface configuration or internal structure of the object is obtained. The streak tube 38 has a gating function; that is, the streak tube is so designed that it outputs the streak image of the input image on the photocathode in response to a high-voltage gate pulse generated by the gate pulse generator 48. When gating operation is carried out at the streak tube side, a photocathode gate, a MCP (Micro Channel Plate) gate, or a shift electrode gate is used. Especially, when the streak tube is not equipped with the MCP inside, a gate I.I. (Image Intensifier) may be equipped between the streak tube and the reading device (SIT) camera for the gating operation.

With the object movement measuring apparatus only thus organized, in obtaining the sectional surface configuration and the sectional image of the object 34 which is in motion, all the images of the moving object 34 are integrated as the output image of the streak tube 38, and therefore, when a light beam with high-speed repetition, compared with the movement speed of the object, is applied to the object, it is impossible to evaluate the motion of the object. Therefore, in the apparatus of FIG. 1, the movement monitor 36 detects the movement of the object 34 to output a detection signal, and with the detection signal as a synchronizing signal the gate trigger signal generator 37 provides a gate trigger signal to the gate pulse generator 48. And the gate pulse generator 48 provides the streak tube 38 with the gate pulse. On the other hand, in order to prevent the difficulty that the image formed on the photocathode is made foggy by movement of the object, the monitor outputs a focusing signal according to the movement of the object 34 detected. The focusing signal is applied to the image-forming lens system 35 to control the latter. If the image-forming lens system is such that the depth of field in the direction of motion of the object is within the distance of motion of the object, then it is not always necessary to use the focusing signal to control the image-forming lens system.

In the case where the object under measurement makes a periodic motion, the movement monitor may detect the motion period. In this case, it is not always necessary that the signal generating period of the gate trigger signal generator is equal to the period of motion of the object; however, it may be an integer multiple or integer fraction thereof. Furthermore, if a phase shifting circuit is used to shift the phase of the gate trigger signal little by little with respect to the period of motion of the object, then the motion of the parts of the object which are slightly different in position from one another can be detected.

Thus, time division images can be obtained on the output surface of the streak tube with the timing of the gate trigger signal; that is, the movement of the object can be detected by successively cutting out the parts of the moving object with intervals corresponding to the repetitive speed of the gating operation.

Figure 2A:
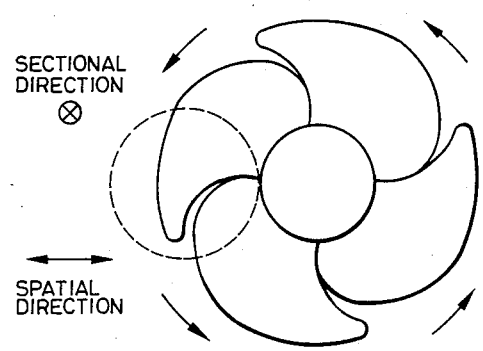
FIGS. 2(a) and 2(b) are diagrams showing one example of an object to be measured with the apparatus, a propeller.
Figure 2B:
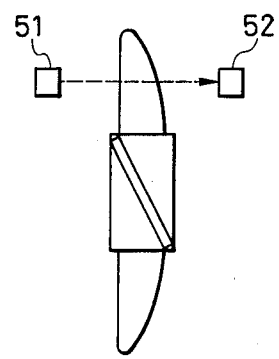

FIGS. 2(a) and 2(b) show one example of the object to be measured with the apparatus shown in FIG. 1, which is a propeller with four blades.

Figure 2C:
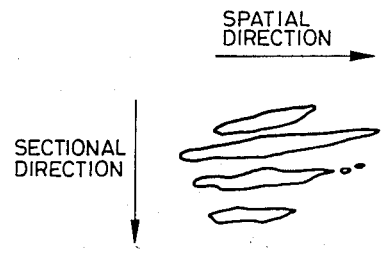
FIG. 2(c) is a diagram showing a result of the analysis, in a sectional direction, of a rotating propeller of FIGS. 2(a) and 2(b)

FIG. 2(c) is a diagram showing a result of the analysis of the motion of the propeller in a sectional direction which is carried out with the apparatus of FIG. 1. FIG. 2(c) clearly shows the movement of the propeller with the timing of the gate trigger signal.

In FIG. 2(b) is also shown an example of the movement monitor for producing the synchronizing signal. In order to monitor the movement of the propeller with four blades, there equipped are an illuminator 51 and a photodetector 52. When one of blades exists between the illuminator 51 and the photodetector 52, the photodetector 52 does not receive the light because of the interruption by the blade. On the other hand, when there exists no blade in the light path between the illuminator 51 and the photodetector 52, the light is detected by the photodetector 52. An output produced by the photodetector 52 is synchronous with the movement (rotation) of the propeller. If there are four blades in the propeller as shown in FIG. 2, four output pulses are produced by the photodetector 52 per one rotation of the propeller. For example, by dividing the frequency of the output with four pulses per one rotation, the synchronizing signal with one pulse per one rotation of the propeller can be obtained.

The synchronizing signal can also be produced with a reflection-type arrangement of the illuminator and the photodetector. A diffraction plate is stuck on the object, in this case on one side of the blade. A monochrome laser beam emitted from the illuminator is diffracted by the diffraction plate on the object and a diffracted pattern of the laser beam is detected by the photodetector.

Figure 3:
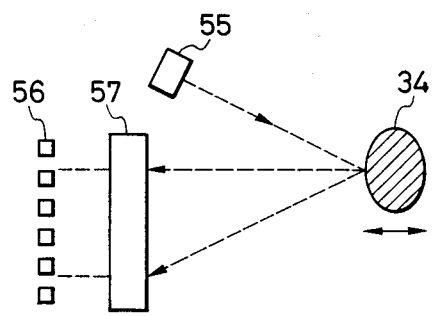
FIG. 3 is a diagram showing one example of an object movement monitor for producing a focusing signal.

In FIG. 3 is shown an example of the movement monitor for producing the focusing signal. In this example, there equipped are an illuminator 55, a photosensor array 56 and an optical system 57 in order to monitor the movement of the object 34. The side of the object 34 is illuminated by the illuminator 55 and the reflected light from the side of the object 34 is imaged on the one-dimensional photosensor array 56 by an optical system 57. According to the back and forth movement of the object 34, the distribution of the reflected light on the photosensor array 56 varies. The distribution of the reflected light is converted into the distribution of electric signals detected by the photosensors of the array 56. The focusing signal can be obtained from the variation of the distribution of this electric signals, for example from the movement of the center of the distribution.

The focusing signal can also be produced by detecting a movement of a speckle pattern which occurs when the object is illuminated by laser beam.

Figure 4:
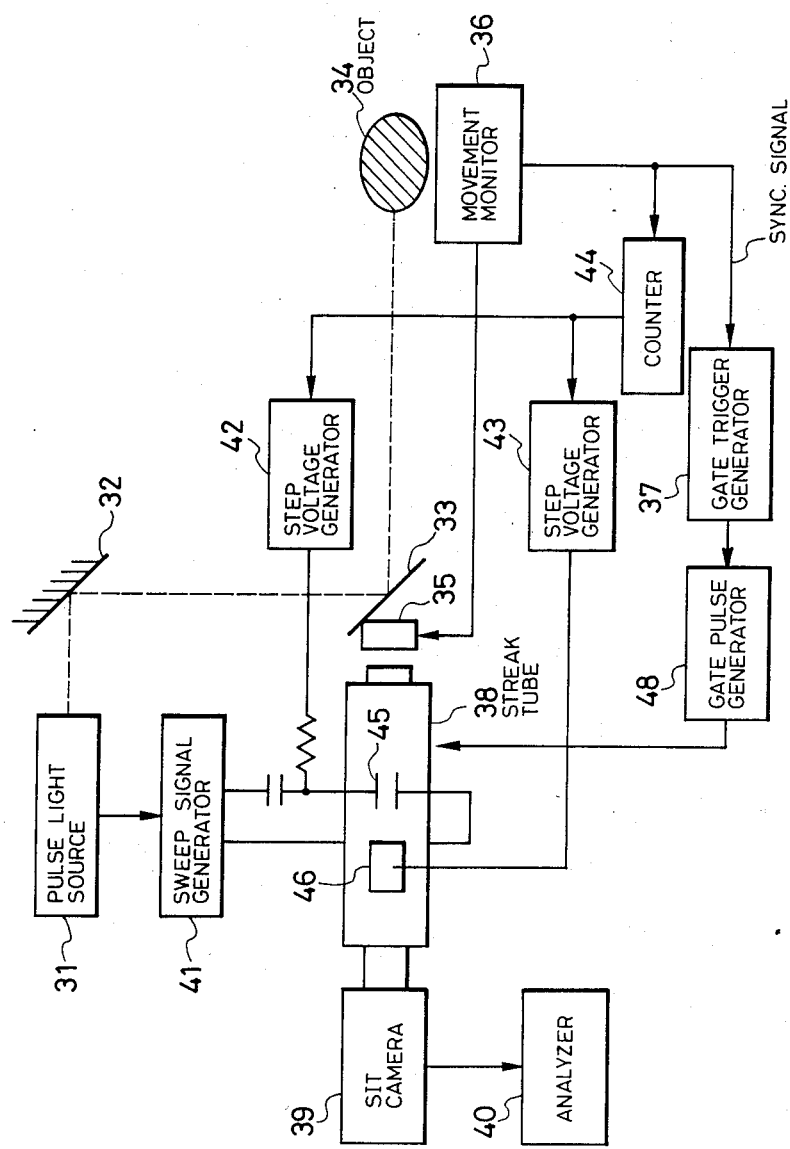
FIG. 4 is a block diagram showing the arrangement of a second example of the object movement measuring apparatus of the invention.

FIG. 4 shows a second example of the object movement measuring apparatus according to the invention. In FIG. 4, those which have been previously described with reference to FIG. 1 are therefore designated by the same reference numerals. In FIG. 4, reference numeral 41 designates a sweep signal generator; 42 and 43, step voltage generators; 44, a counter; 45, vertical deflection electrodes; and 46, horizontal deflection electrodes.

The apparatus of FIG. 4 is so designed as to eliminate the problem in which, in the case of an object in which the surface configuration is maintained unchanged and only the internal structure is changed, the sectional images taken in synchronization with the gate trigger signals are two-dimensionally arranged on the phosphor screen of the streak tube 38 and overlapped one on another.

A synchronizing signal outputted from the movement monitor 36 is counted by the counter 44, and step voltages are produced by the step voltage generators 42 and 43 in correspondence to the count value of the counter 44. The output voltage of the step voltage generator 42 in addition to the sweep voltage of the sweep signal generator 41 is applied to the vertical deflection electrodes 45, while the output voltage of the step voltage generator 43 is applied to the horizontal deflection electrodes 46, so that the resultant streak images are shifted both in horizontal direction and in vertical direction. Therefore, the variation with time of the internal structure can be clearly observed.

In the above-described apparatus, the step voltages are applied to both of the horizontal and vertical deflection electrodes. However, the apparatus may be so modified that a step voltage is applied to on of the horizontal and vertical deflection electrodes. In this modification also, the streak images can be displayed at different positions on the phosphor screen of the streak tube in synchronization with the gate trigger signals.

Though the SIT camera is used as the reading device in the foregoing embodiment, a charge-coupled device (CCD) camera may be used instead of the SIT camera.

As is apparent from the above description, with the object movement measuring apparatus of the invention, the motion of an object which is moving at high-speed can be analyzed in a sectional direction at a given time instant according to the variation with time thereof. For instance, the object movement measuring apparatus of the invention, unlike the conventional one, can analyze the motion of a propeller which is being rotated at high speed, or the motion of object therein.

What is claimed is:

1. An object movement measuring apparatus, comprising:
    a pulse light source;
    an optical system for illuminating an object under measurement with a light beam emitted by said pulse light source;
    a streak tube having a photocathode and a pair of vertical deflection electrodes, for detecting a reflection light beam or a transmission light beam from said object and outputting a streak image output;
    a sweep signal generator for receiving a part of said light beam emitted by said pulse light source and providing a sweep signal to said pair of vertical deflection electrodes of said streak tube;
    an image-forming lens system for focusing said reflection light beam or said transmission light beam on said photocathode of said streak tube;
    a movement monitor for detecting movement of said object and producing a synchronizing signal which is synchronous with said movement; and
    a gate trigger signal generator for producing a sequential gate trigger signal to trigger said streak tube according to said synchronizing signals sent from said movement monitor.

2. An apparatus as claimed in claim 1, further comprising a reading device for detecting said streak image output of said streak tube and outputting an electric streak signal.

3. An apparatus as claimed in claim 2, wherein said reading device is a silicon intensifier target (SIT) camera.

4. An apparatus as claimed in claim 2, wherein said reading device is a charge-coupled device (CCD) camera.

5. An apparatus as claimed in claim 2, further comprising an analyzer for receiving said electric streak signal from said reading device and analyzing said electric streak signal to determine a surface configuration or an internal structure of said object.

6. An apparatus as claimed in claim 1, wherein said movement monitor detects a period of movement of said object.

7. An apparatus as claimed in claim 6, wherein said gate trigger signal generator produces said gate trigger signal whose period is an integer multiple or an integer fraction of said period of movement of said object.

8. An apparatus as claimed in claim 7, wherein said gate trigger signal generator comprises a phase shift circuit which gradually shifts a phase of said gate trigger signal with said movement of said object.

9. An apparatus as claimed in claim 1, wherein said movement monitor provides a focusing signal to said image-forming lens system.

10. An apparatus as claimed in claim 1, wherein said image-forming lens system has such characteristics that depth of field of said lens system in a direction of movement of said object is within a distance of movement of said object.

11. An apparatus as claimed in claim 1, further comprising:
    a counter for counting said synchronizing signal sent from said movement monitor and outputting a count value; and
    a first step voltage generator for outputting a first step voltage according to said count value received from said counter; wherein
    said pair of vertical deflection electrodes of said streak tube is provided with said first step voltage in addition to said sweep signal by said first step voltage generator.

12. An apparatus as claimed in claim 11, further comprising:
    a second step voltage generator for outputting a second step voltage according to said count value received from said counter; wherein
    said streak tube further has a pair of horizontal deflection electrodes and said pair of horizontal deflection electrodes is provided with said second step voltage by said second step voltage generator.

* * * * *